(12) United States Patent
Sun

(10) Patent No.: US 9,393,700 B2
(45) Date of Patent: Jul. 19, 2016

(54) METHOD FOR AUTOMATICALLY POSITIONING A CASING WITH SUPPORT PORTIONS

(71) Applicant: HIWIN TECHNOLOGIES CORP., Taichung (TW)

(72) Inventor: Tung-Liang Sun, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 118 days.

(21) Appl. No.: 14/468,593

(22) Filed: Aug. 26, 2014

(65) Prior Publication Data

US 2016/0059421 A1    Mar. 3, 2016

(51) Int. Cl.
*B25J 15/02* (2006.01)
*B25J 15/00* (2006.01)

(52) U.S. Cl.
CPC .......... *B25J 15/0253* (2013.01); *B25J 15/0014* (2013.01)

(58) Field of Classification Search
CPC ............... B25J 15/0253; B25J 15/0014; B25J 15/0273; B25J 15/0047; B44C 1/24; C25F 3/02; C25F 3/04; C25F 3/06; C25F 3/08; C25F 3/14

USPC .......................................................... 901/31
See application file for complete search history.

(56) References Cited

U.S. PATENT DOCUMENTS

| 4,696,503 A * | 9/1987 | Collodel .............. B25J 15/0273 901/37 |
| 7,887,108 B1 * | 2/2011 | Cawley .................. B25J 15/026 414/731 |
| 2013/0248486 A1 * | 9/2013 | Lancaster-Larocque . C25F 3/20 216/53 |

* cited by examiner

*Primary Examiner* — Gerald McClain
(74) *Attorney, Agent, or Firm* — Wang Law Firm, Inc.

(57) ABSTRACT

A method for automatically positioning a casing includes: placing the casing onto a shelf with the opening of the casing facing toward a robot arm; controlling a distance between two clamping portions of a clamping device to be larger than a distance between two lateral flat surfaces of the casing, making the support portions located towards the opening and lower than the top inner surface of the casing; using the robot arm to move the support portions through the opening into the casing, making the support portions extend over a gravity center of the casing, and lifting the casing; moving the casing until the casing is stopped against the sucker, and moving the support portions with respect to the casing until the top lateral surface is stopped against the clamping device; and moving the two clamping portions toward each other to clamp the casing.

4 Claims, 16 Drawing Sheets

METHOD FOR AUTOMATICALLY POSITIONING A CASING WITH SUPPORT PORTIONS

BACKGROUND OF THE INVENTION

1. Field of the Invention

The present invention relates to a device and a method for positioning a casing, and more particularly to a device and method for automatically positioning a casing.

2. Description of the Prior Art

A product with a casing, such as a switch hub, a heat radiator, hard disc, etc, is normally subjected labeling or laser engraving process to have product related information, such as model number, manufacturing date, place of production, etc, shown on the casing.

However, the casing must be positioned before labeling or laser engraving, and the conventional method for positioning the casing mainly includes manual and mechanical positioning.

Manual positioning method requires an operator to hold the casing with the opening of the casing facing forward, then put the casing onto a tool which is formed to fit the size of the casing, and push the casing to make the inner surface of the opening abut against the tool, so that the casing is positioned or fixed. Manual positioning method has the disadvantages of being labor intensive, and low processing and manufacturing efficiency.

Mechanical positioning method also requires the operator to position the casing with a tool, then use a robot arm equipped with a horizontally-opening clamping device clamp the casing and move it to a predetermined position. If the clamping force is insufficient, the casing is likely to falling off when the casing is subjected to an external force during the course of labeling or other processing course. If the clamping force is overly large, the casing might be damaged.

The present invention has arisen to mitigate and/or obviate the afore-described disadvantages.

SUMMARY OF THE INVENTION

The primary objective of the present invention is to provide a device and method for automatically positioning a casing, which offers the advantages of being labor saving, and capable of improving processing and manufacturing efficiency.

Another objective of the present invention is to provide a device and method for automatically positioning a casing, which is capable of reducing the occurrence of falling off and damage to the casing.

To achieve the above objectives, a method for automatically positioning a casing in accordance with the present invention is used in combination with a sucker and a robot arm which is provided with a clamping jaw and a clamping device to automatically position the casing which is formed with an opening, and the method comprises: a step of placing a casing including placing the casing onto a shelf, and making the opening of the casing located toward the robot arm, wherein the casing includes a top lateral surface which defines the opening, an up-facing to-be-processed surface, a top inner surface opposite the to-be-processed surface, a bottom lateral surface opposite the top lateral surface, and two lateral flat surfaces connected between the top and bottom lateral surfaces; a step of prior lifting including controlling a distance between the two clamping portions of the clamping device to be larger than a distance between the two lateral flat surfaces of the casing, making the support portions of the clamping device located towards the opening of the casing and lower than the top inner surface of the casing; a step of lifting including using the robot arm to move the support portions of the clamping device through the opening into the casing, making free ends of the support portions extend over a center of gravity of the casing, and then lifting the casing; a step of front-and-rear positioning including moving the casing to a position where the bottom lateral surface are stopped against the buffer plate of the sucker, and moving the support portions with respect to the casing until the top lateral surface of the casing is stopped against the abutting surfaces of the clamping device; and a step of left-and-right positioning including moving the two clamping portions toward each other to clamp the lateral flat surfaces of the casing.

Preferably, the step of lifting further includes using the clamping device to lift the casing, and then moving the two clamping portions towards each other until they clamp the lateral flat surfaces of the casing, and the step of front-and-rear positioning further includes moving the casing to the sucker, and moving the two clamping portions away from each other to release the clamping portions from the lateral flat surfaces of the casing.

Preferably, the sucker includes a fixing plate, a plurality of connecting rods disposed on the fixing plate, a buffer plate which is disposed on the connecting rods and capable of moving towards or away from the fixing plate to push against a bottom lateral surface of the casing, and a plurality of elastic members sleeved onto the connecting rods and located between the fixing plate 31 and the buffer plate to push the fixing plate and the buffer plate away from each other.

To achieve the above objectives, a method for automatically positioning a casing in accordance with the present invention is used in combination with a sucker and a robot arm which is provided with a clamping jaw and a clamping device to automatically position the casing which is formed with an opening, and the method comprises: a step of placing a casing including placing the casing onto a shelf, and making the opening of the casing located toward the robot arm, wherein the casing includes a top lateral surface which defines the opening, an up-facing to-be-processed surface, a top inner surface opposite the to-be-processed surface, a bottom lateral surface opposite the top lateral surface, and two lateral flat surfaces connected between the top and bottom lateral surfaces; a step of prior clamping including controlling a distance between the two clamping portions of the clamping device to be larger than a distance between the two lateral flat surfaces of the casing, and making the support portions of the clamping device located towards the opening of the casing and lower than the top inner surface of the casing; a step of clamping including using the robot arm to move the support portions of the clamping device through the opening into the casing, keeping moving the clamping device to a depth where the two clamping portions are capable of securely clamping the casing, then moving the clamping portions toward each other to clamp the lateral flat surfaces of the casing; a step of putting the casing including using the robot arm to move the casing to a flat work area, stopping the casing a position above a flat work surface, and releasing the clamping portions from the lateral flat surfaces of the casing by moving the clamping portions away from each other, and letting the casing fall onto the flat work surface; a step of prior lifting including controlling a distance between the two clamping portions of the clamping device to be larger than a distance between the two lateral flat surfaces of the casing, making the support portions of the clamping device located towards the opening of the casing and lower than the top inner surface of the casing; a step of lifting including using the robot arm to move the support portions of the clamping device through the opening into the casing, making free ends of the support portions extend over a center of gravity of the casing, and then lifting the casing; a step of front-and-rear positioning including moving the casing to a position where the bottom lateral surface are stopped against the buffer plate of the sucker, and moving the support portions with respect to the casing until the top lateral surface of the casing is stopped against the abutting surfaces of the clamping device; and a step of left-and-right positioning including moving the two clamping portions toward each other to clamp the lateral flat surfaces of the casing.

Preferably, the step of lifting further includes using the clamping device to lift the casing, and then moving the two clamping portions towards each other until they clamp the lateral flat surfaces of the casing, and the step of front-and-rear positioning further includes moving the casing to the sucker, and moving the two clamping portions away from each other to release the clamping portions from the lateral flat surfaces of the casing.

Preferably, the sucker includes a fixing plate, a plurality of connecting rods disposed on the fixing plate, a buffer plate which is disposed on the connecting rods and capable of moving towards or away from the fixing plate to push against a bottom lateral surface of the casing, and a plurality of elastic members sleeved onto the connecting rods and located between the fixing plate and the buffer plate to push the fixing plate and the buffer plate away from each other.

To achieve the above objectives, a device for automatically positioning a casing in accordance with the present invention comprises: a robot arm; a clamping jaw provided on the robot arm; and a clamping device including two connecting portions which are capable of moving towards or away from each other and are provided on the clamping jaw. Each of the connecting portions includes an abutting surface, a support portion and a clamping portion. Each of the support portions includes a top support surface located lower than a corresponding one of the abutting surfaces, and two lateral support surfaces at two sides of the top support surface. Each of the clamping portions is connected to a corresponding one of the connecting portions and located at a corresponding one of the lateral support surfaces.

Preferably, each of the support portions includes a bottom support surface opposite the top support surface, and at least one reinforced rib at the bottom support surface.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
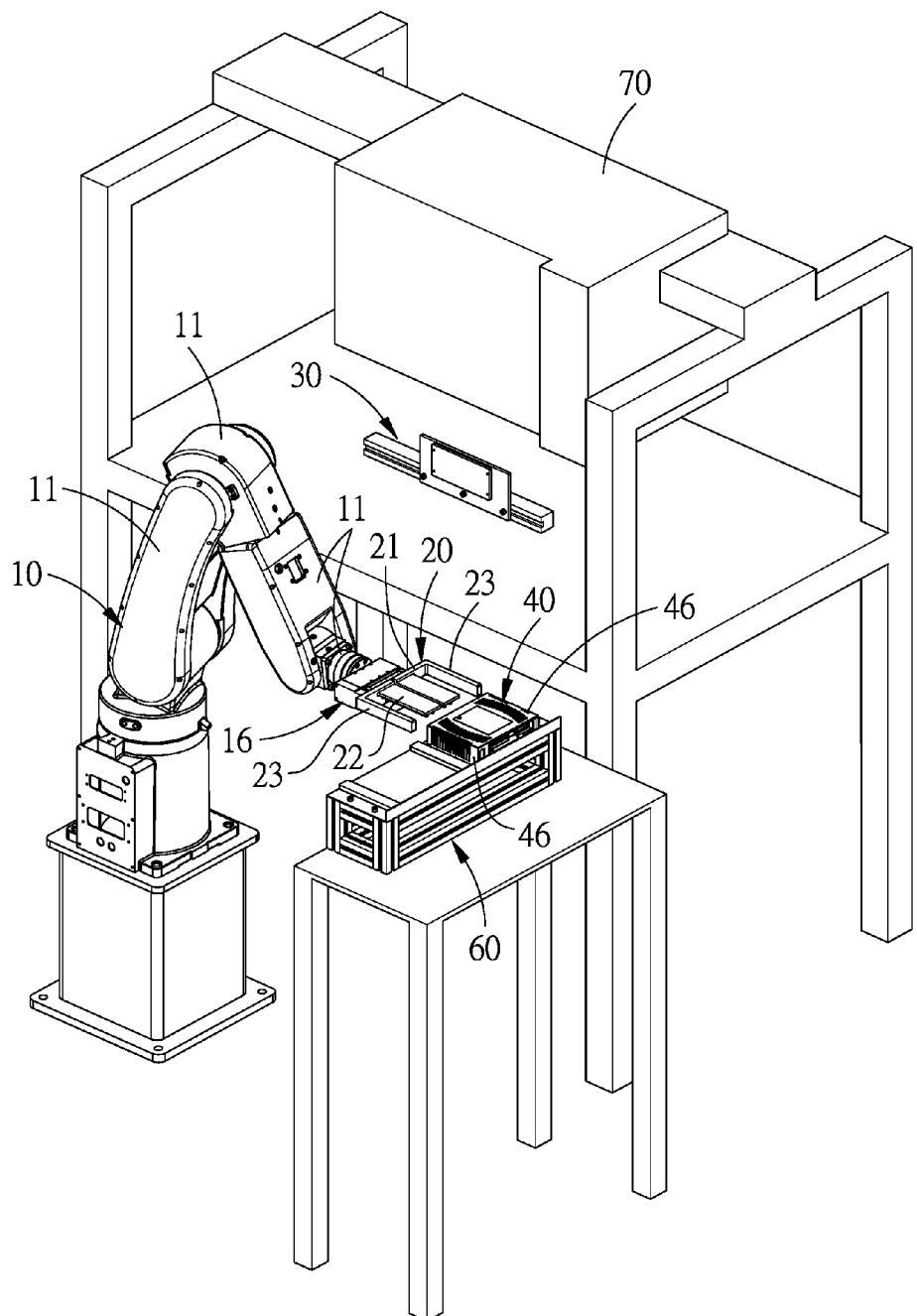
FIG. 1 is an illustrative view of the present invention, showing the step of placing the casing, and the step of prior lifting or prior clamping.
Figure 2:
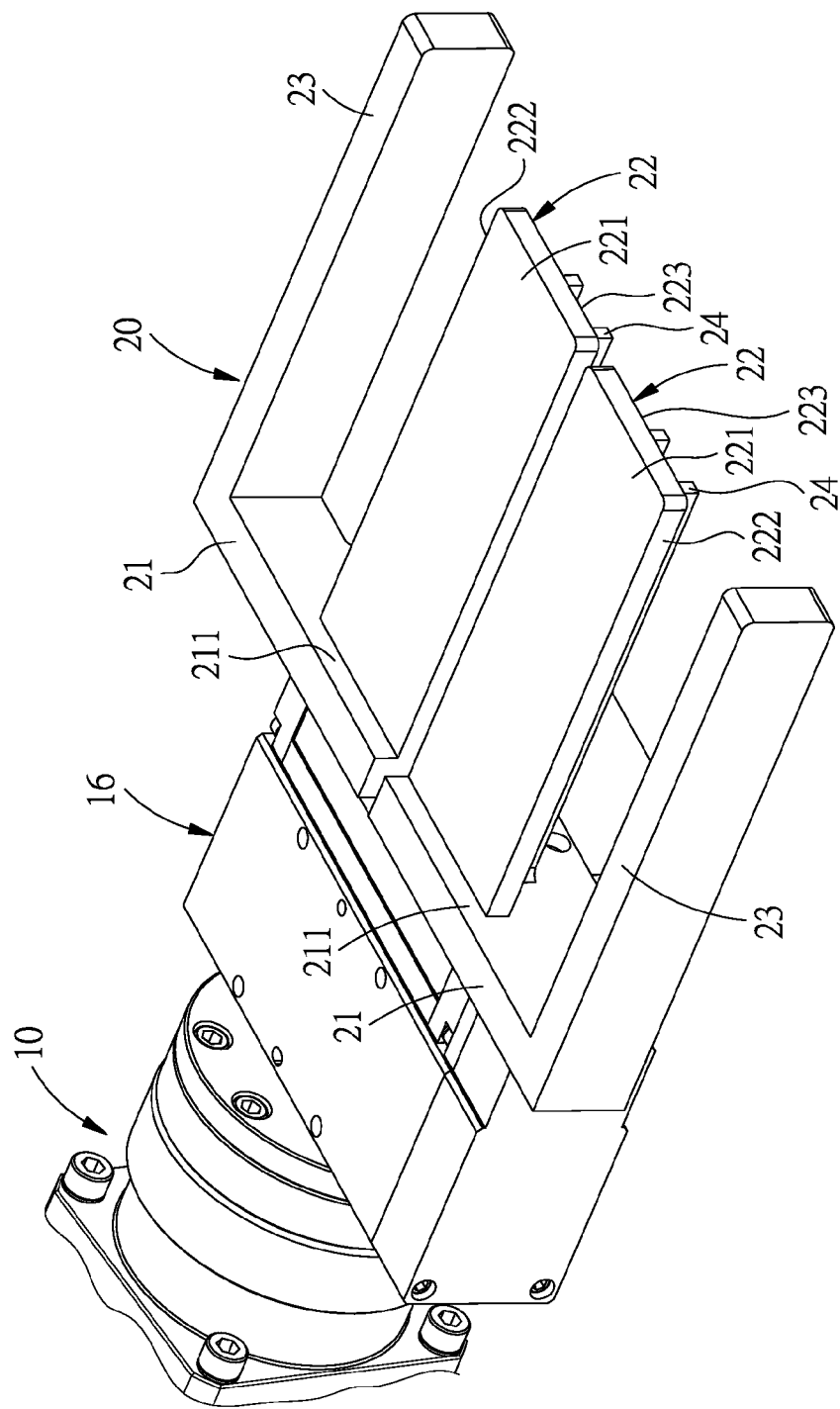
FIG. 2 is a perspective view of the present invention showing that the clamping jaw and the clamping device are assembled on the robot arm.

Referring to FIGS. 1 and 2, a device for automatically positioning a casing in accordance with the present invention comprises: a robot arm 10, a clamping jaw 16 and a clamping device 20.

The robot arm 10 has at least three degrees of freedom and comprises a plurality of joints 11 which are capable of pivoting or swinging with respect to one another. In actual application, the robot arm 10 can includes a pivoting joint and two linearly sliding joints.

The clamping jaw 16 is provided on the robot arm 10. In this embodiment, the clamping jaw 16 is a horizontally-opening jaw and provided with two slide table (not shown) consisting of linear guideways. Since the clamping jaw 16 is of a conventional structure, further explanations are omitted here.

The clamping device 20 includes: two connecting portions 21 which are capable of moving towards or away from each other and are provided on the clamping jaw 16. Each of the connecting portions 21 includes an abutting surface 211, a support portion 22 and a clamping portion 23. Each of the support portions 22 includes a top support surface 221 located lower than a corresponding one of the abutting surfaces 211, and two lateral support surfaces 222 at two sides of the top support surface 221. Each of the clamping portions 23 is connected to a corresponding one of the connecting portions 21 and located at a corresponding one of the lateral support surfaces 222. In this embodiment, each of the support portions 22 includes a bottom support surface 223 opposite the top support surface 221, and two reinforced ribs 24 at the bottom support surface 223 to strengthen the structure of the support portions 22 in the form of a flat plate. It is to be noted that the two clamping portions 23 are also capable of moving towards or away from each other since they are formed on the two connecting portions 21, respectively.

Figure 3:
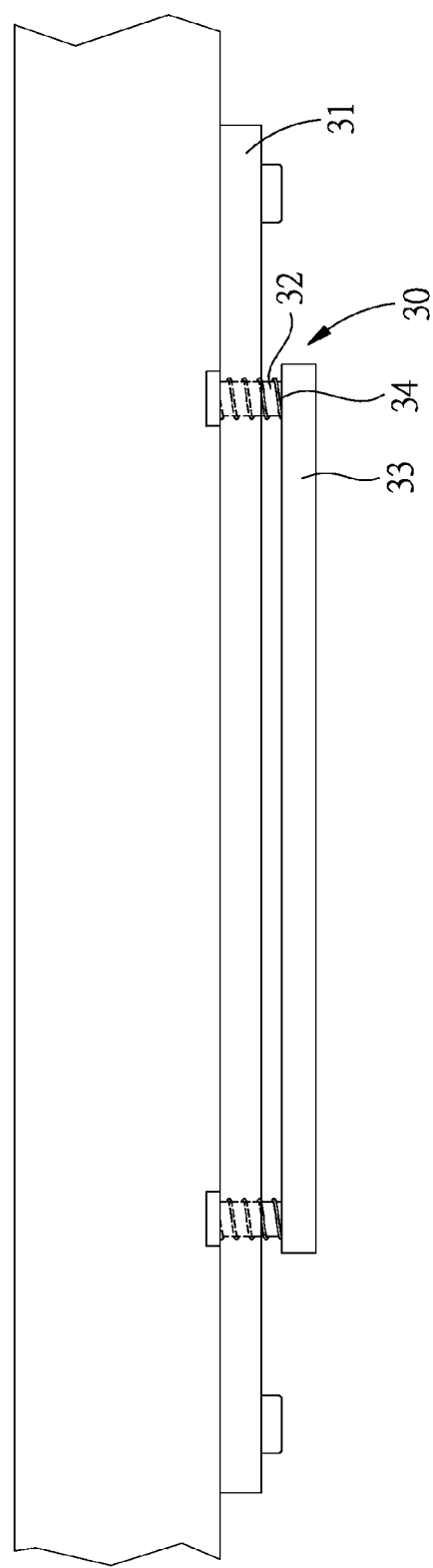
FIG. 3 is a top view of the present invention showing the sucker.
Figure 4:
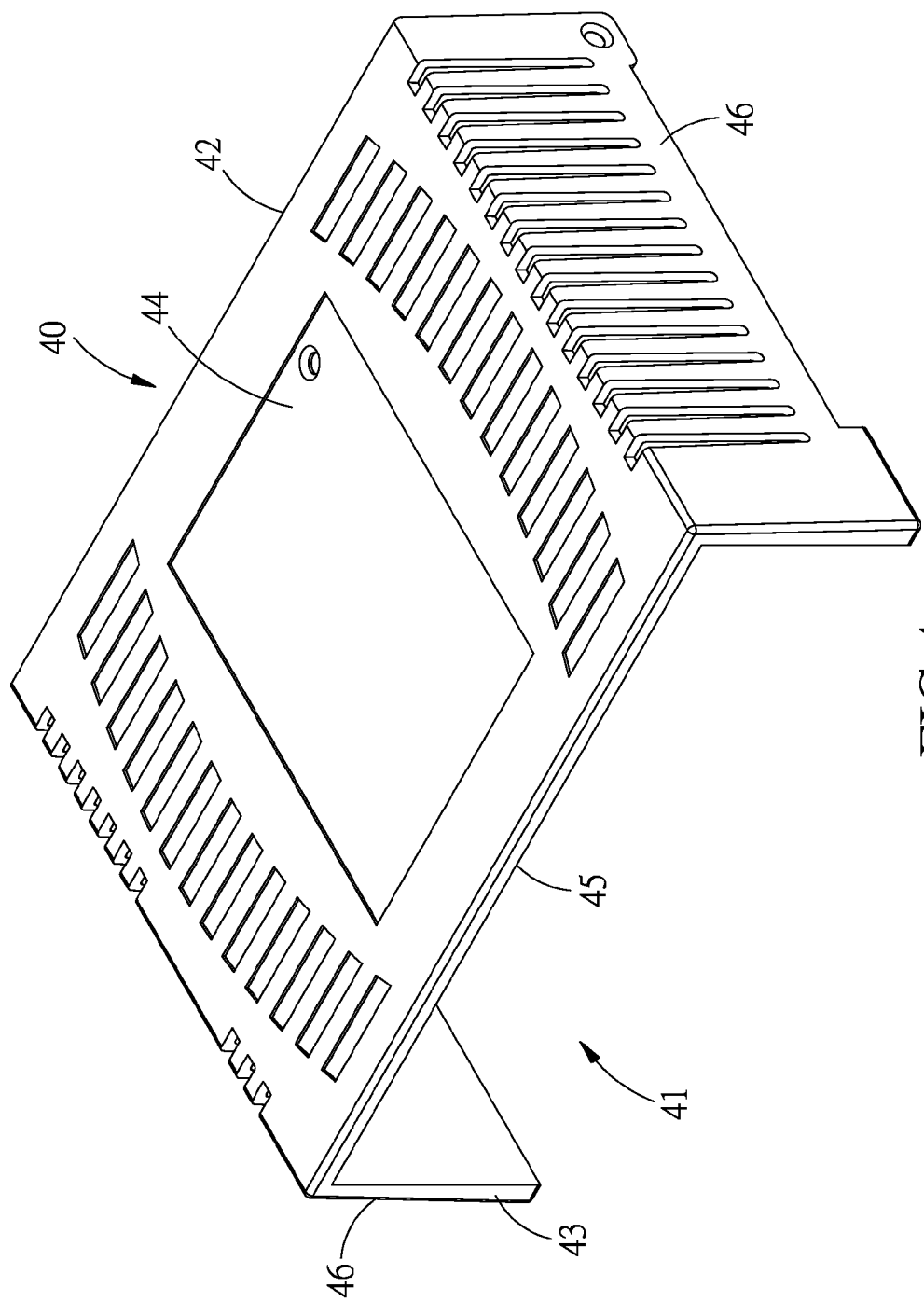
FIG. 4 is a perspective view of the present invention showing a casing.

A method for automatically positioning a casing in accordance with the present invention is used in combination with a sucker 30 and the robot arm 10 which is provided with the clamping jaw 16 and the clamping device 20 to automatically position a casing, preferably, the casing 40 (as shown in FIG. 4) which is formed with an opening 41. As shown in FIGS. 1 and 3, the sucker 30 includes a fixing plate 31, a plurality of connecting rods 32 disposed on the fixing plate 31, a buffer plate 33 which is disposed on the connecting rods 32 and capable of moving towards or away from the fixing plate 31 to push against a bottom lateral surface 42 of the casing 40, and a plurality of elastic members 34 sleeved onto the connecting rods 32 and located between the fixing plate 31 and the buffer plate 33 to push the fixing plate 31 and the buffer plate 33 away from each other.

Figure 5:
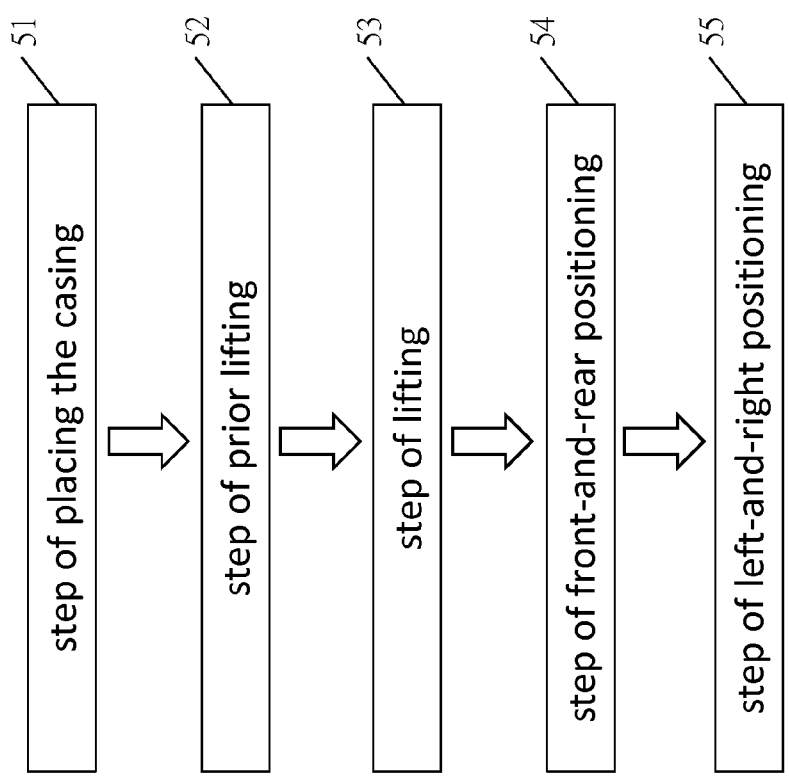
FIG. 5 is a flow chart showing the steps of the method for automatically positioning the casing in accordance with a first or a second embodiment of the present invention.

Referring to FIG. 5, a method for automatically positioning a casing in accordance with a first embodiment of the present invention comprises: a step 51 of placing the casing, a step 52 of prior lifting, a step 53 of lifting, a step 54 of front-and-rear positioning, and a step 55 of left-and-right positioning.

The step 51 of placing a casing, as shown in FIGS. 1 and 4, includes placing the casing 40 onto a shelf 60, and making the opening 41 of the casing 40 located toward the robot arm 10. The casing 40 further includes a top lateral surface 43 which defines the opening 41, an up-facing to-be-processed surface 44, a top inner surface 45 opposite the to-be-processed surface 44, the bottom lateral surface 42 opposite the top lateral surface 43, and two lateral flat surfaces 46 connected between the top and bottom lateral surfaces 43, 42. In this embodiment, there is only one layer of shelve 60 for easy explanation, and in actual application, there can be multiple layers of shelves 60.

The step 52 of prior lifting, as shown in FIGS. 1, 2 and 4, includes controlling a distance between the two clamping portions 23 of the clamping device 20 to be larger than a distance between the two lateral flat surfaces 46 of the casing 40, making the support portions 22 of the clamping device 20 located towards the opening 41 of the casing 40 and lower than the top inner surface 45 of the casing 40, and moving the two clamping portions 23 to the two lateral flat surfaces 46 of the casing 40.

Figure 6:
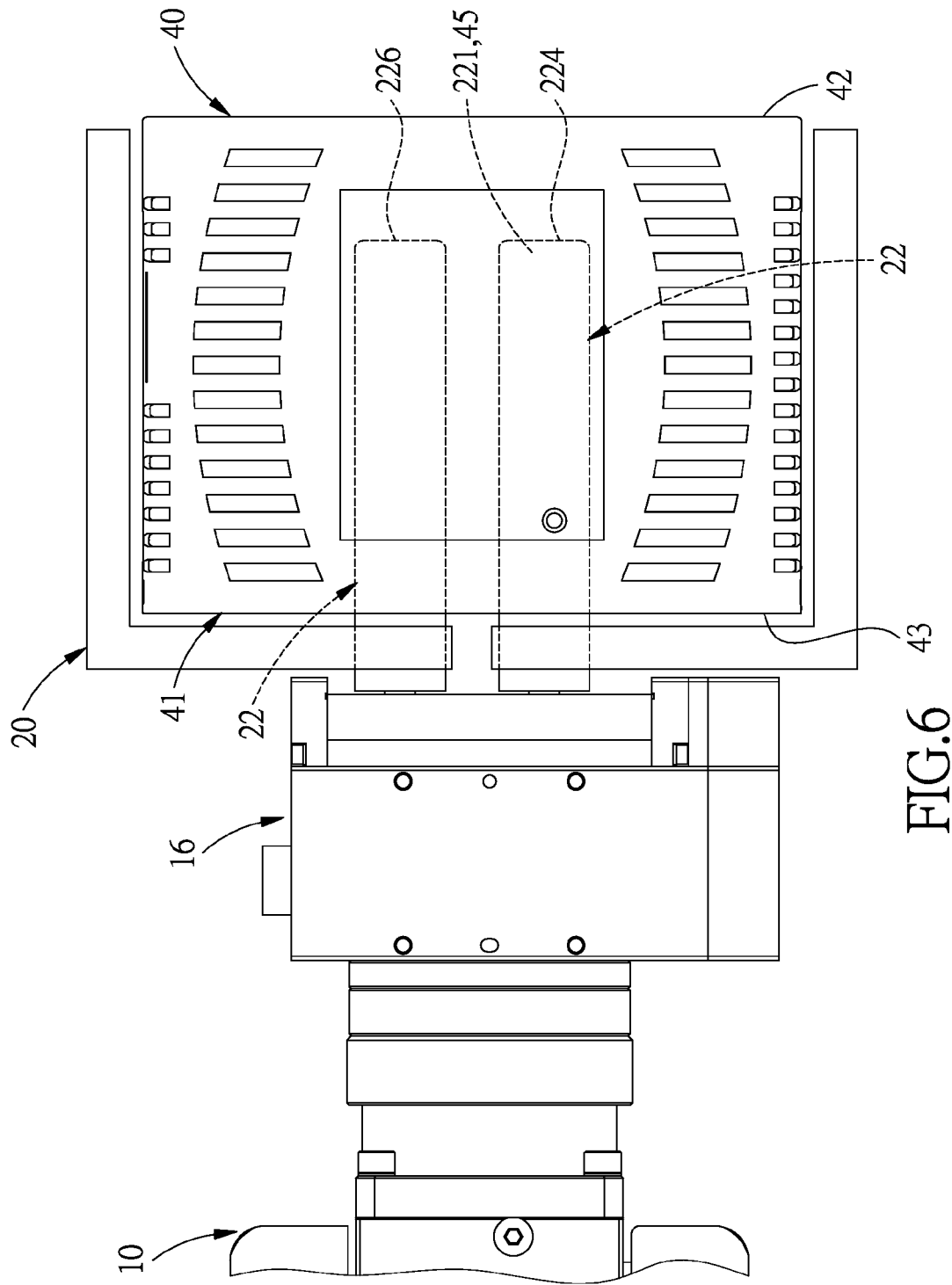
FIG. 6 is an illustrative view showing the step of lifting of the method for automatically positioning the casing in accordance with the present invention.
Figure 7:
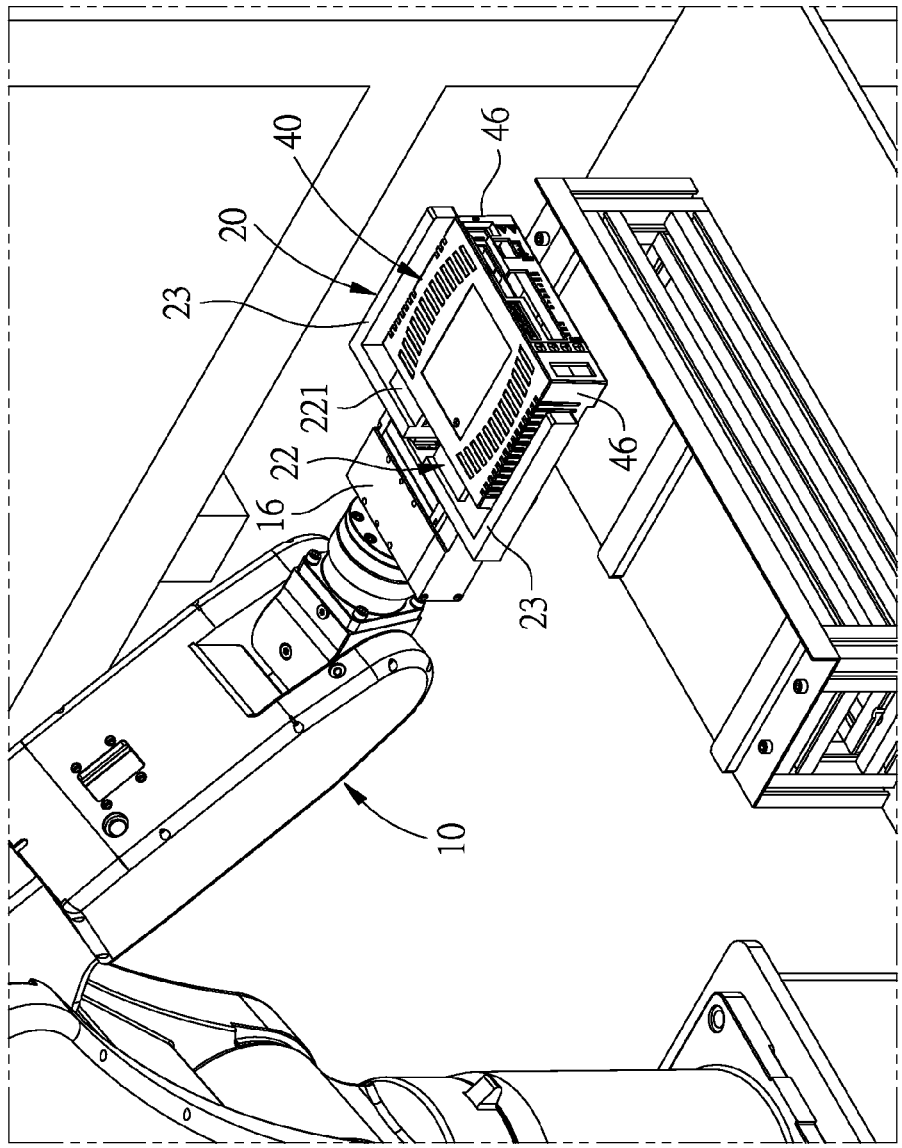
FIG. 7 is another illustrative view showing the step of lifting of the method for automatically positioning the casing in accordance with the present invention.

The step 53 of lifting, as shown in FIGS. 4, 6 and 7, includes using the robot arm 10 to move the support portions 22 of the clamping device 20 through the opening 41 into the casing 40, making free ends 224 of the support portions 22 extend over the center of gravity of the casing 40, and then lifting the casing 40. In this embodiment, when the support portions 22 lift the casing 40, the top support surfaces 221 of the support portions 22 will push against the top inner surface 45 of the casing 40. The "free ends 224 of the support portions 22 extend over the center of gravity of the casing 40 means that the free ends 224 of the support portions 22 are located between the top and bottom lateral surfaces 43, 42 of the casing 40, and are closer to the bottom lateral surface 42, so that the casing 40 won't fall off of the support portions 22 when being lifted.

Figure 8:
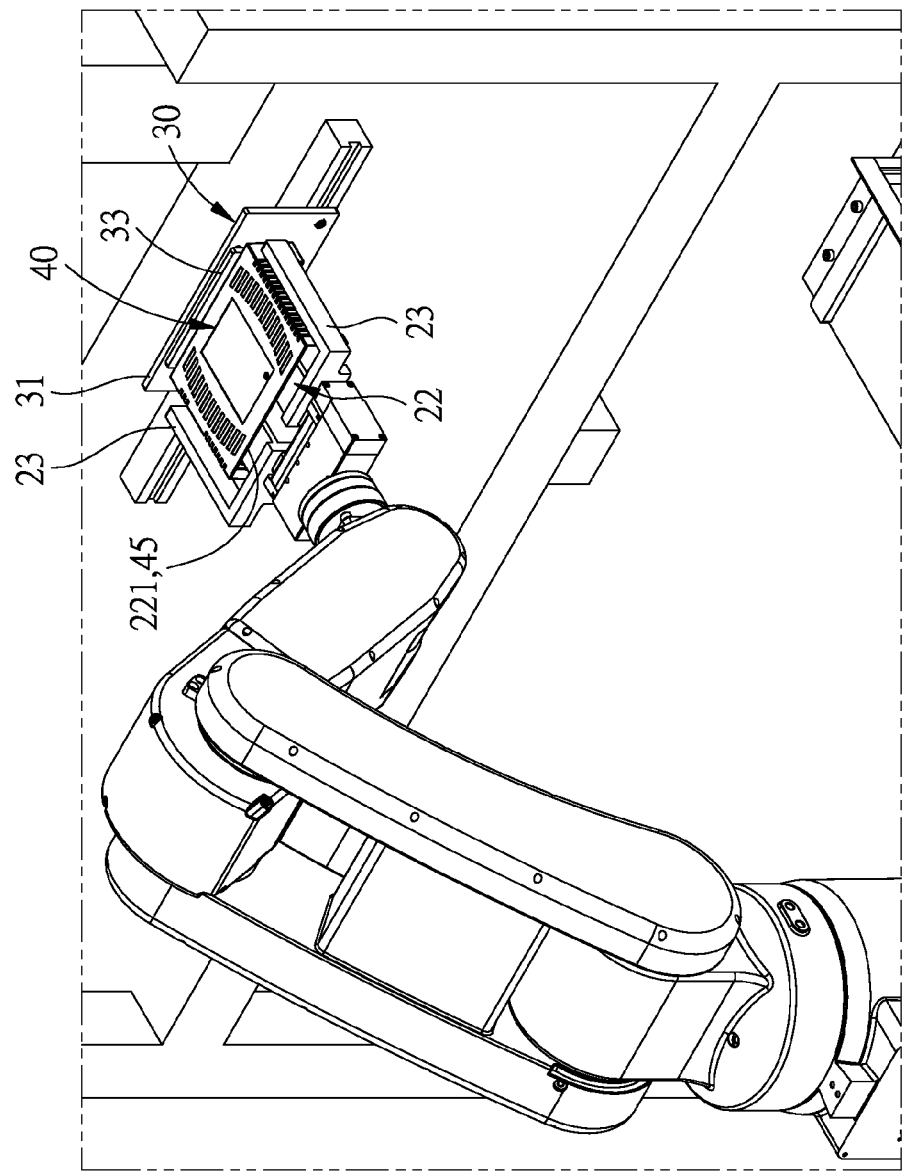
FIG. 8 is an illustrative view showing the step of front-and-rear positioning of the method for automatically positioning the casing in accordance with the present invention.
Figure 9:
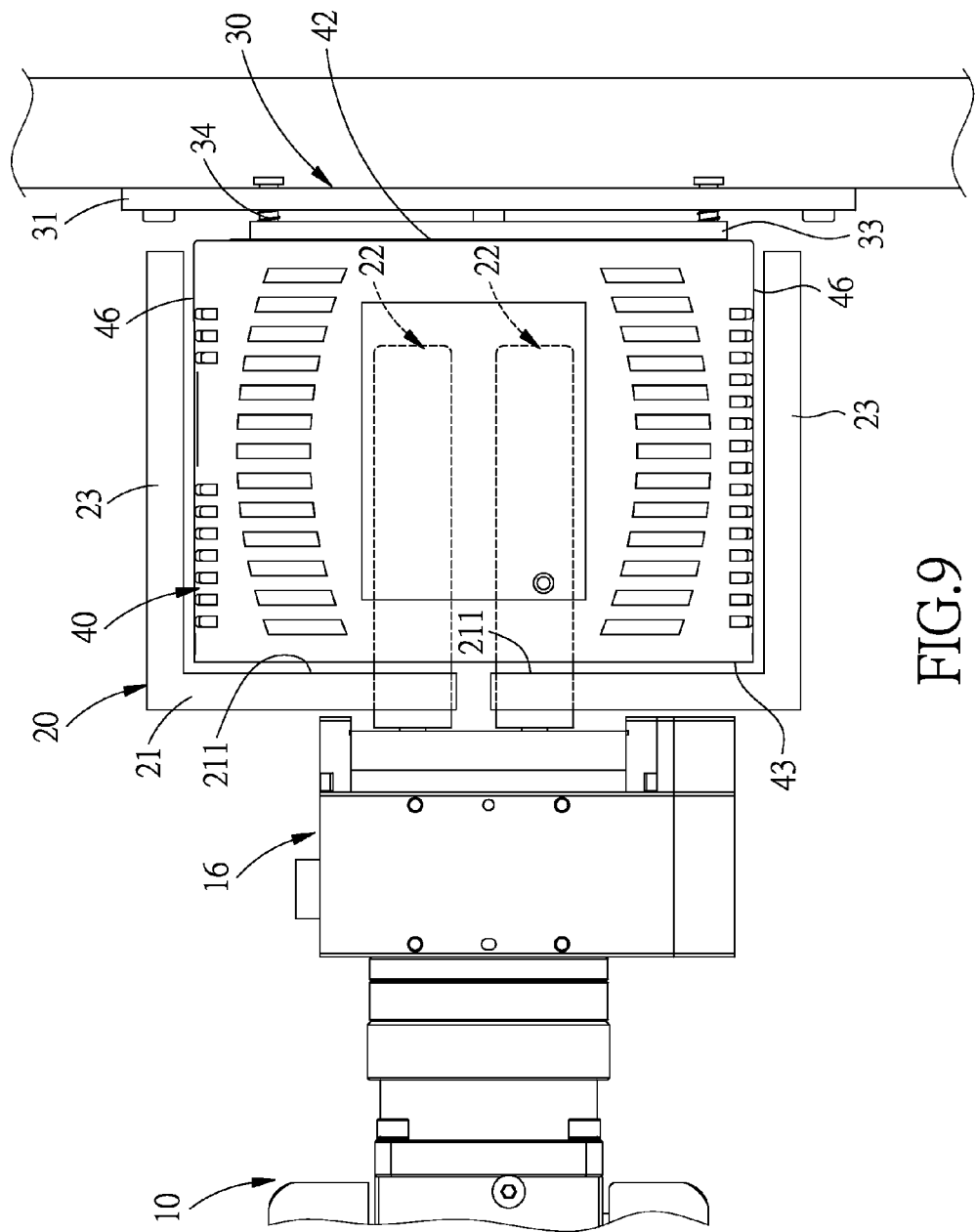
FIG. 9 is another illustrative view showing the step of front-and-rear positioning of the method for automatically positioning the casing in accordance with the present invention.
Figure 10:
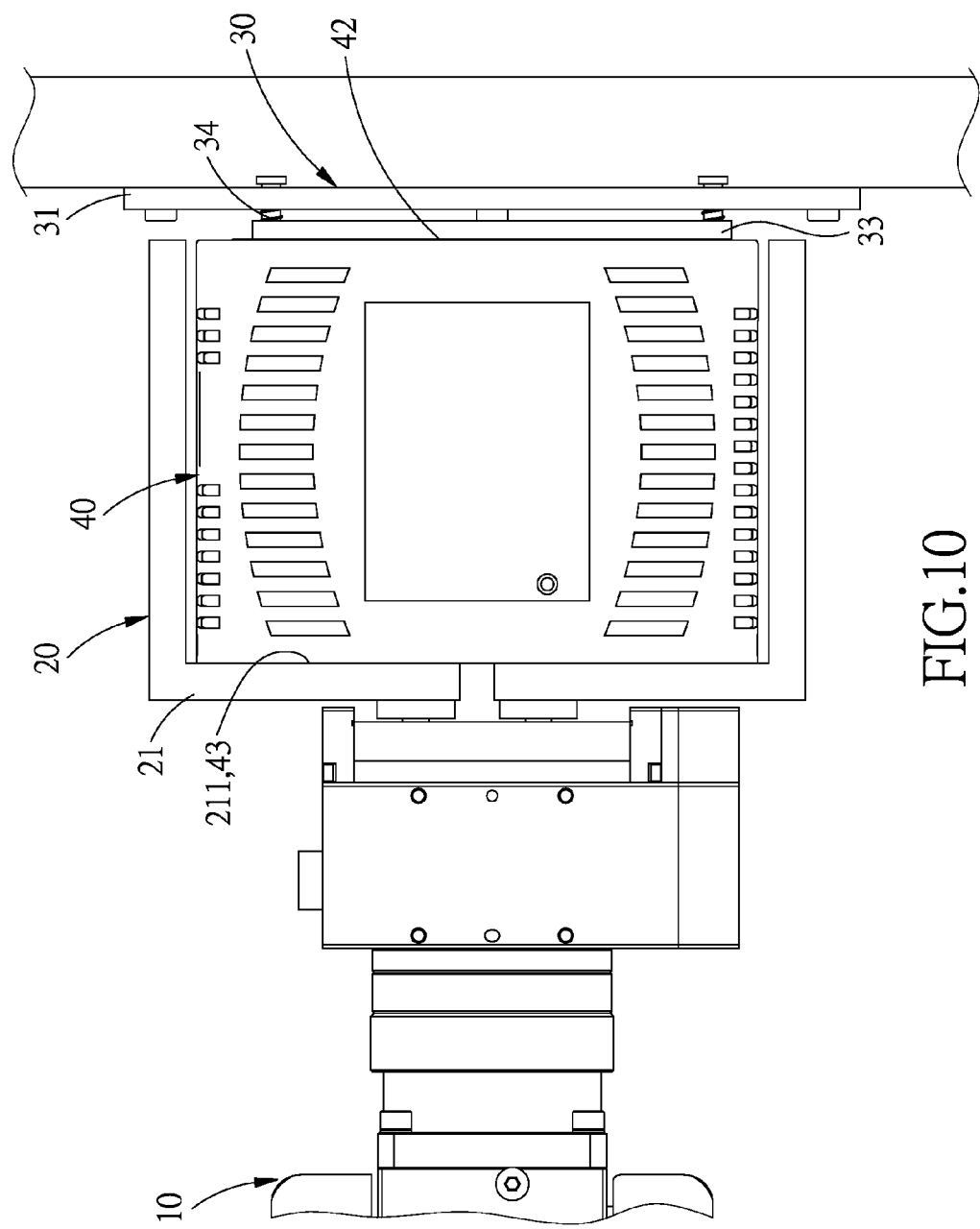
FIG. 10 is another illustrative view showing the step of front-and-rear positioning of the method for automatically positioning the casing in accordance with the present invention.

The step 54 of front-and-rear positioning, as shown in FIGS. 8, 9 and 10, includes moving the casing 40 to a position where the bottom lateral surface 42 are stopped against the buffer plate 33 of the sucker 30, and moving the support portions 22 with respect to the casing 40 until the top lateral surface 43 of the casing 40 is stopped against the abutting surfaces 211 of the clamping device 20. In this embodiment, the bottom lateral casing 40 is firstly positioned by resting against the buffer plate 33 of the sucker 30. When the clamping device 20 moves the casing 40 toward the sucker 30, the support portions 22 will move horizontally with respect to the casing and toward the sucker 30 until the abutting surfaces 211 of the clamping device 20 are abutted against the top lateral surface 43 of the casing 40. The elastic members 34 disposed between the buffer plate 33 and the fixing plate 31 provide a buffer effect therebetween, which therefore prevents the clamping device 20, the casing 40 and the sucker 30 from directly impacting one another and causing damage in the casing that the clamping device 20 continues to move toward the sucker 30 after the bottom lateral surface 42 of the casing 40 is stopped against the sucker 30, and the abutting surfaces 211 of the clamping device 20 are abutted against the top lateral surface 43 of the casing 40, which also ensures that the top lateral surface 43 of the casing 40 and the abutting surfaces 211 of the clamping device 20 keep abutting against each other.

Figure 11:
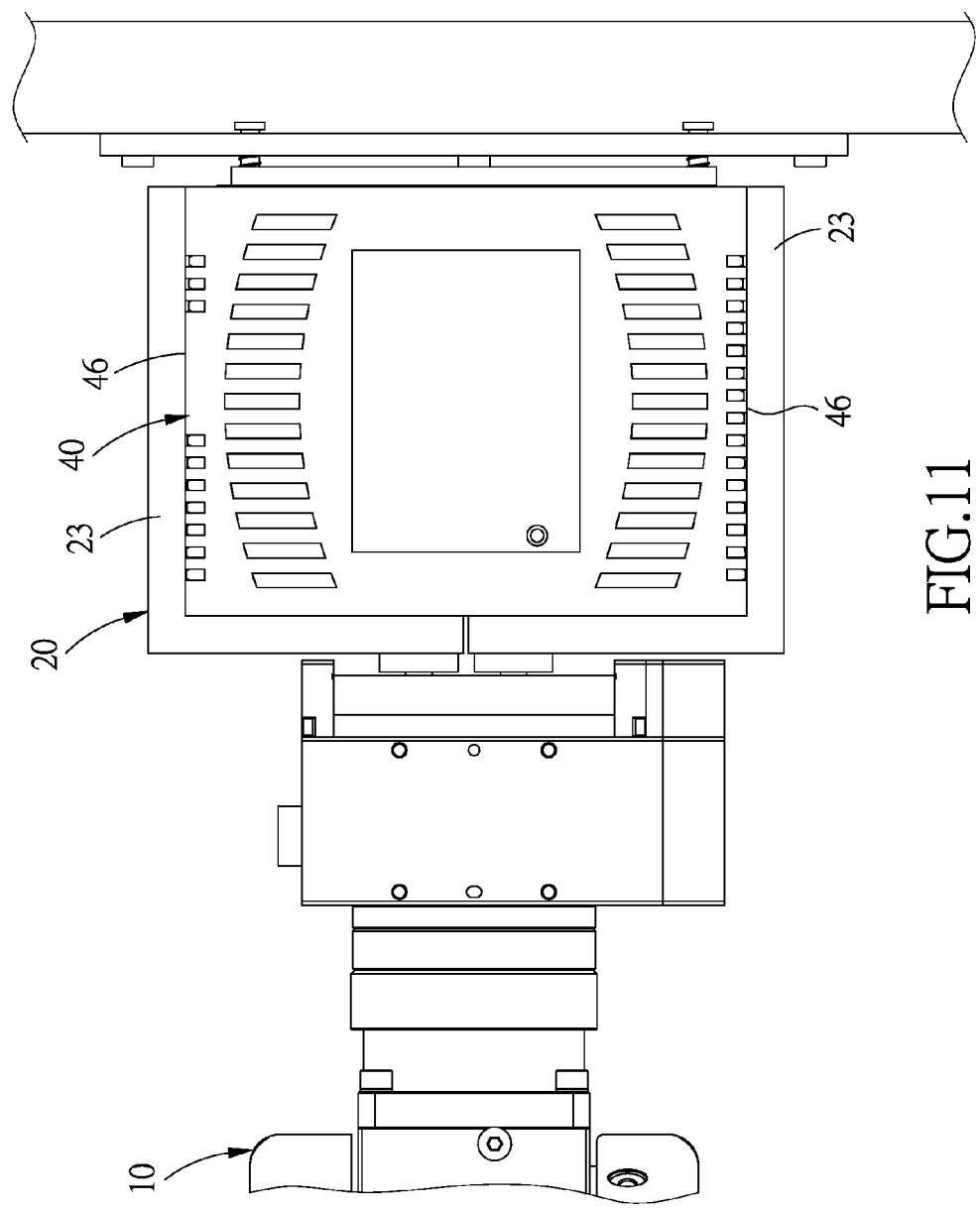
FIG. 11 is an illustrative view showing the step of left-and-right positioning of the method for automatically positioning the casing in accordance with the present invention.

The step 55 of left-and-right positioning, as shown in FIG. 11, includes moving the two clamping portions 23 toward each other to clamp the lateral flat surfaces 46 of the casing 40.

Through the abovementioned steps, the casing 40 can be positioned, and the robot arm 10 is able to move the casing 40 which has been positioned by the previous steps to a position of next process, so that the casing 40 can be processed in the next process. In this embodiment, the casing 40 which has been positioned through the previous steps is moved to a predetermined label position where a labeling machine 70 (as shown in FIG. 1) stick a label onto the casing 40, or the casing 40 can be moved to a laser engraving zone where laser engraving process is carried out.

What mentioned above are the steps of the method for automatically positioning a casing in accordance with the present invention, and for a better understanding of the effects of the embodiment, reference should be made to the following description.

First of all, the method of the present invention is labor-saving and improves production efficiency.

The present invention only require the use of the rob arm 10 with the clamping jaw 16 and clamping device 20, plus the step 51 of placing the casing, the step 52 of prior lifting, the step 53 of lifting, the step 54 of front-and-rear positioning, and the step 55 of left-and-right positioning, the casing 40 can be precisely positioned in an automatic manner without requiring any manual intervention. Hence, the present invention is free of the disadvantages caused by manual positioning, such as labor intensive, lower processing and production efficiency.

On the other hand, the present invention is capable of reducing the occurrence of falling off or damage to the casing.

The casing 40 is lifted from down to up by the support portions 22 of the clamping device 20, during which, the support portions 22 of the clamping device 20 won't clamp the casing 40, and the support portions 22 of the clamping device 20 will extend over the gravity center of the casing 40 to prevent the casing 40 from falling off of the support portions 22. After that, the positioning of the casing 40 can be finished by continuously carrying out the steps of front-and-rear positioning and left-and-right positioning. The casing 40 won't be clamped by the two clamping portions 23 during the course of being lifted. Hence, the casing 40 won't be affected by the uncertainties, for instance, the clamping force is insufficient or overly large, thus reducing the occurrence of fall off or be damage to the casing 40.

Referring to FIG. 5, a method for automatically positioning a casing in accordance with a second embodiment of the present invention is similar to the first embodiment and also comprises: a step 51 of placing the casing, a step 52 of prior lifting, a step 53 of lifting, a step 54 of front-and-rear positioning, and a step 55 of left-and-right positioning, except the following differences.

Figure 12:
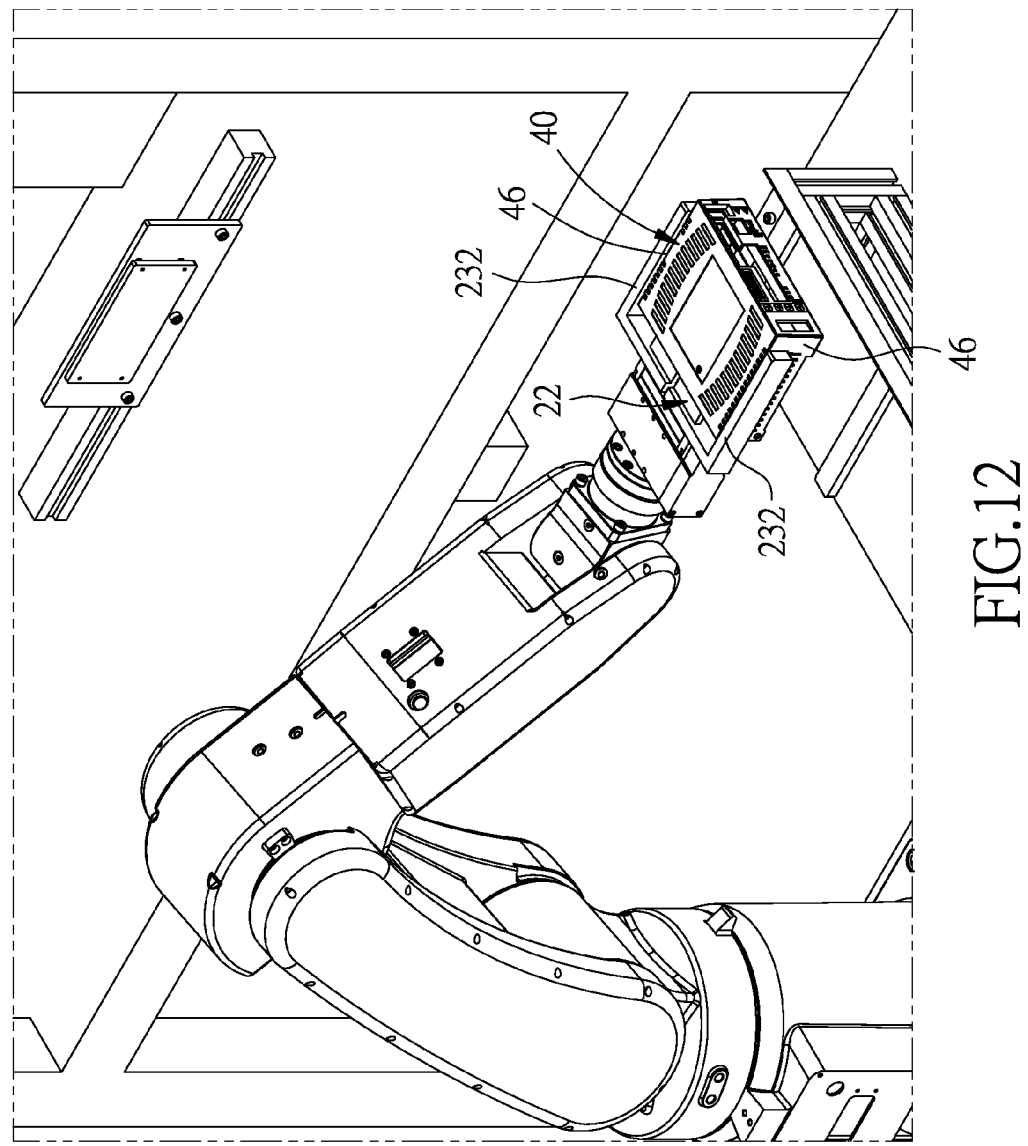
FIG. 12 is an illustrative view of the present invention showing that the clamping jaws are used to clamp the casing.

The step 53 of lifting, as shown in FIG. 7, includes using the clamping device 20 to lift the casing 40 as shown in FIG. 7, and then moving the two clamping portions 23 towards each other until they clamp the lateral flat surfaces 46 of the casing 40, as shown in FIG. 12. In this embodiment, the clamping force applied onto the lateral flat surfaces 46 of the casing 40 by the two clamping portions 23 is controlled as small as possible, as along as the clamping portions 23 come into contact with or come close to the casing 40. Hence, the clamping portions 23 can restrict the casing 40 from falling off of the support portions 22, when the casing 40 is being lifted.

The step 54 of front-and-rear positioning, as shown in FIG. 9, includes moving the casing 40 to the sucker 30, as shown in FIG. 9, then moving the two clamping portions 23 away from each other to release the clamping portions 23 from the lateral flat surfaces 46 of the casing 40, then horizontally moving the support portions 22 with respect to the casing 40 to a position where the subsequent steps 54, 55 of front-and-rear positioning and left-and-right positioning.

Figure 13:
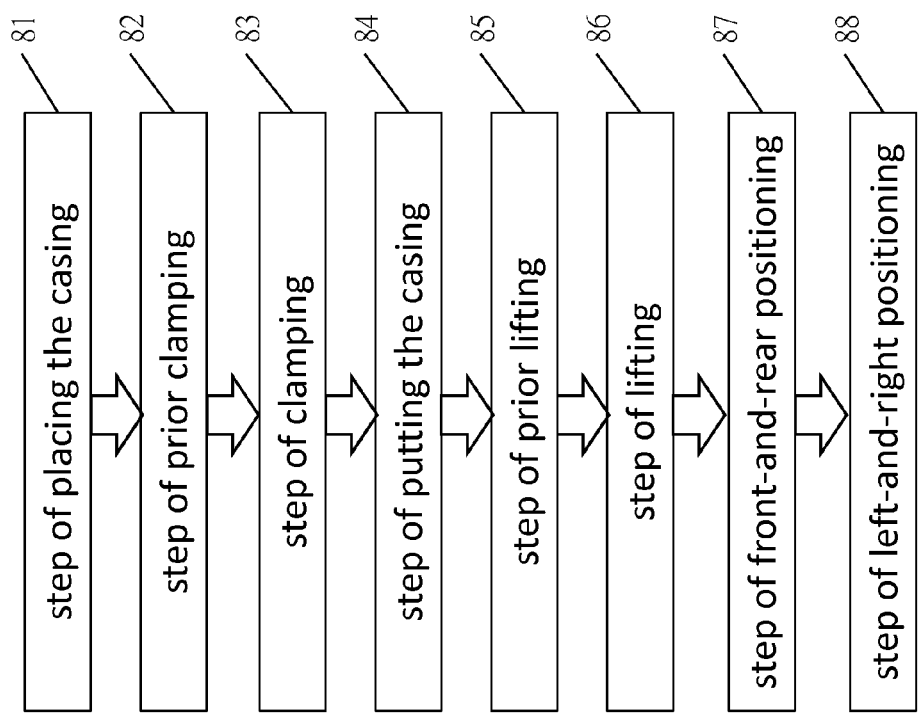
FIG. 13 is a flow chart showing the steps of the method for automatically positioning the casing in accordance with a third or fourth embodiment of the present invention.

The present invention further provides a third embodiment of the method for automatically positioning a casing, which solves the problem that the robot arm is not long enough to directly position the casing after the casing is lifted out of the shelve, in addition to the advantages of being labor saving, and capable of improving processing and manufacturing efficiency, and reducing the occurrence of falling off and damage to the casing. As shown in FIG. 13, the method for automatically positioning a casing in accordance with the third embodiment of the present invention comprises: a step 81 of placing the casing, a step 82 of prior clamping, a step 83 of clamping, a step 84 of putting the casing, a step 85 of prior lifting, a step 86 of lifting, a step 87 of front-and-rear positioning, and a step 88 of left-and-right positioning.

The step 81 of placing the casing is the same as the first embodiment, so no further explanations seem necessary.

The step 82 of prior clamping, as shown in FIGS. 1 and 4, includes controlling a distance between the two clamping portions 23 of the clamping device 20 to be larger than a distance between the two lateral flat surfaces 46 of the casing 40, and making the support portions 22 of the clamping device 20 located towards the opening 41 of the casing 40 and lower than the top inner surface 45 of the casing 40.

Figure 14:
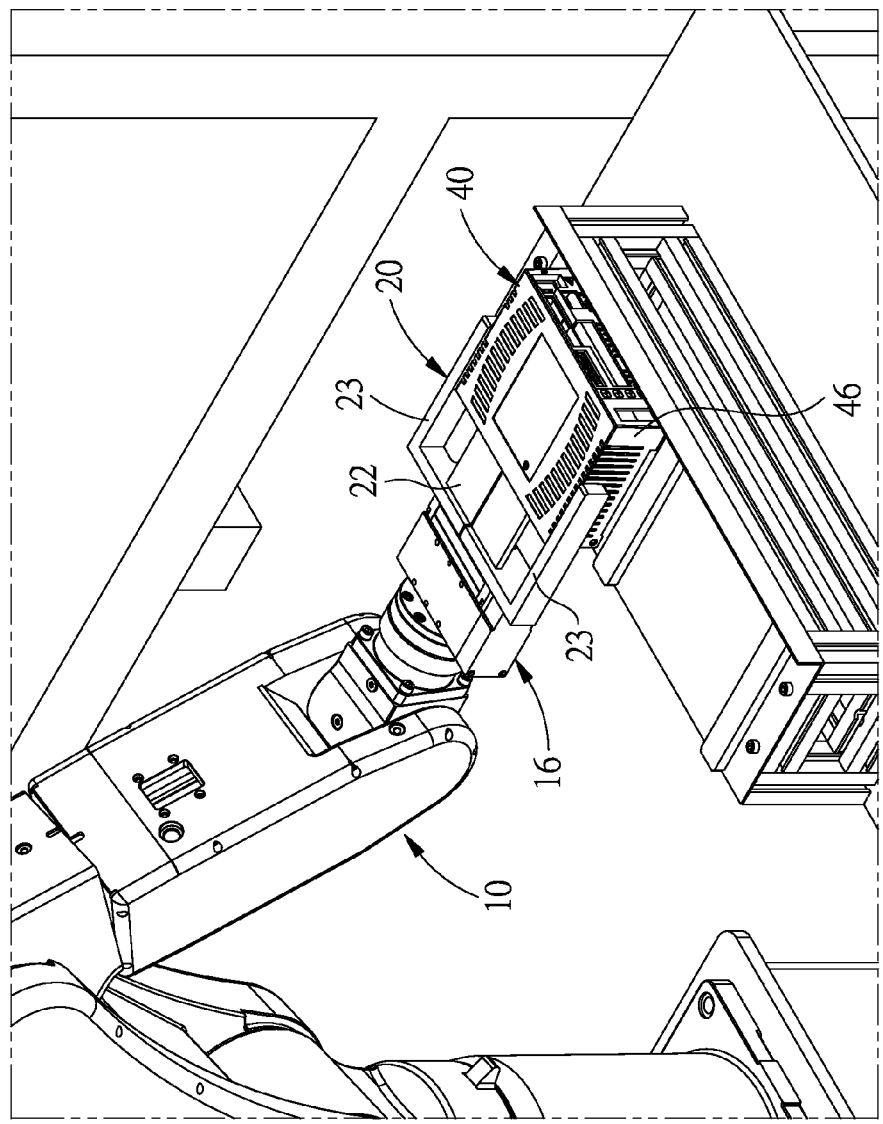
FIG. 14 is an illustrative view showing the step of clamping of the method for automatically positioning the casing in accordance with the present invention.

The step 83 of clamping, as shown in FIGS. 4 and 14, includes using the robot arm 10 to move the support portions 22 of the clamping device 20 through the opening 41 into the casing 40, keeping moving the clamping device 20 to a depth where the two clamping portions 23 are capable of securely clamping the casing 40, then moving the clamping portions 23 toward each other to clamp the lateral flat surfaces 46 of the casing 40.

Figure 15:
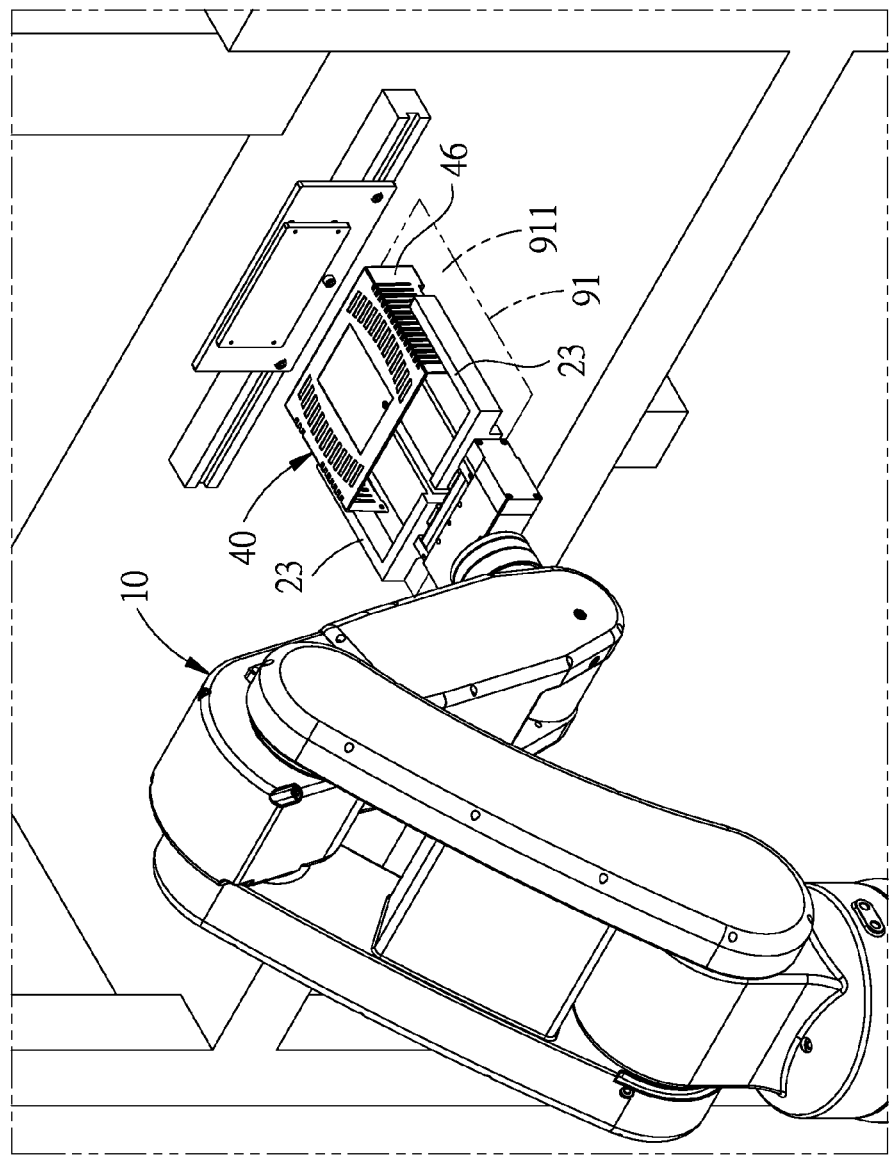
FIG. 15 an illustrative view showing the step of putting the casing of the method for automatically positioning the casing in accordance with the present invention.
Figure 16:
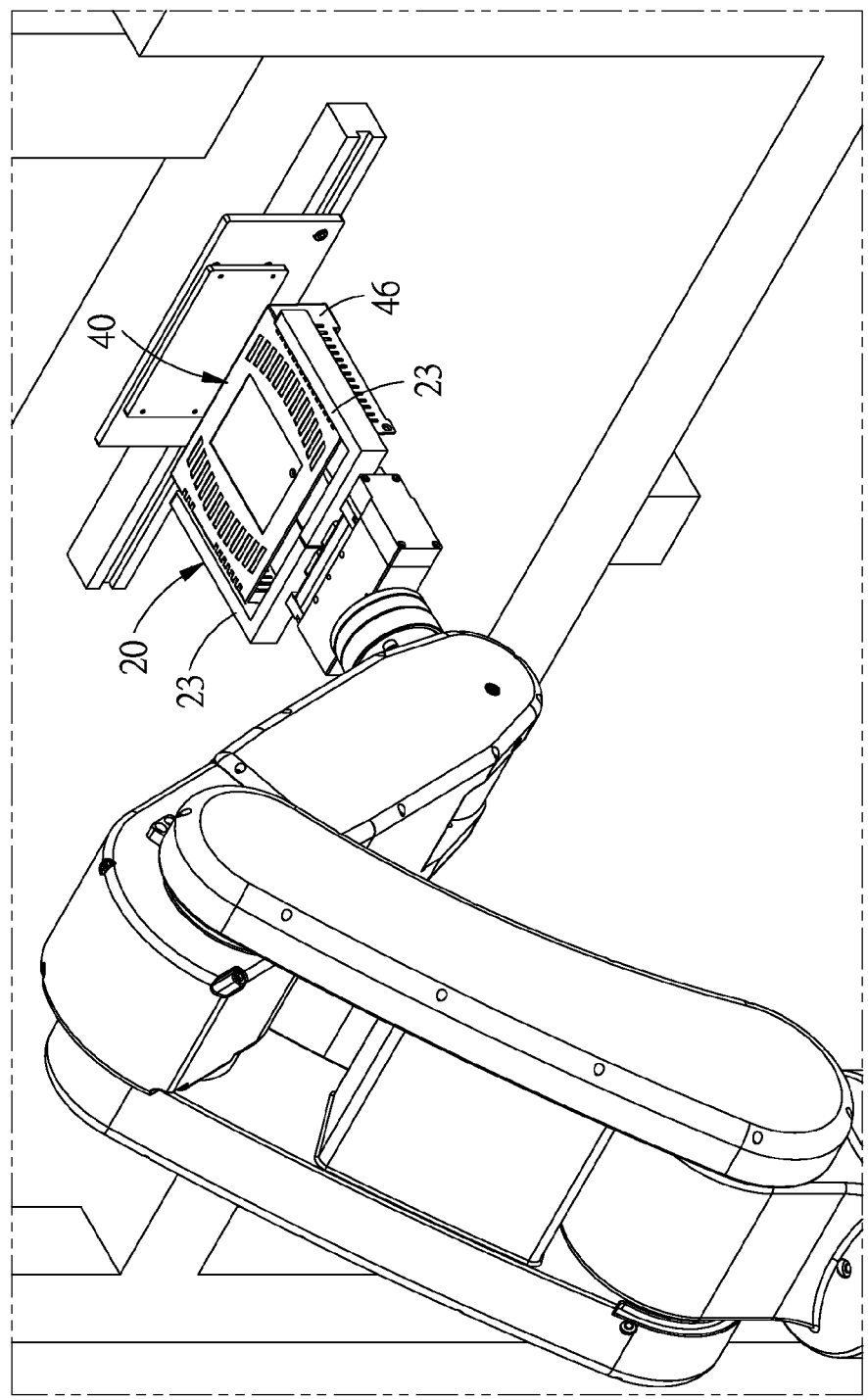
FIG. 16 is an illustrative view of the present invention showing that the clamping jaws are used to clamp the casing.

The step 84 of putting the casing, as shown in FIG. 15, using the robot arm 10 to move the casing 40 to a flat work area 91, stopping the casing 40 a position above a flat work surface 911, and releasing the clamping portions 23 from the lateral flat surfaces 46 of the casing 40 by moving the clamping portions 23 away from each other, and letting the casing 40 fall onto the flat work surface 911.

The step 85 of prior lifting, the step 86 of lifting, the step 87 of front-and-rear positioning, and the step 88 of left-and-right positioning are the same as the step 52 of prior lifting, the step 53 of lifting, the step 54 of front-and-rear positioning, and the step 55 of left-and-right positioning of the first embodiment, so further explanations seem unnecessary. The only difference is that the step 85 of prior lifting, the step 86 of lifting, the step 87 of front-and-rear positioning, and the step 88 of left-and-right positioning of the third embodiment are carried out on the flat work surface 911, while the corresponding steps of the first embodiment are performed on the shelve.

When the length of the robot arm 10 is insufficient to directly position the casing after the casing is lifted out of the shelve, the present invention can use the steps 82, 83 and 84 of prior clamping, clamping, and putting the casing, to move the casing 40 out of the shelve 60 to the flat work surface 911 which is closer to the robot arm 10 than the shelve 60. Then, the robot arm 10 can use the clamping device 20 to move and position the casing 40 by carrying out the step 85 of prior lifting, the step 86 of lifting, the step 87 of front-and-rear positioning, and the step 88 of left-and-right positioning.

As shown in FIG. 13, the method for automatically positioning a casing in accordance with a fourth embodiment of the present invention is similar to the third embodiment, except that:

The step 86 of lifting, as shown in FIG. 14, includes using the clamping device 20 to lift the casing 40, and then moving the two clamping portions 23 towards each other until they clamp the lateral flat surfaces 46 of the casing 40. In this embodiment, the clamping force applied onto the lateral flat surfaces 46 of the casing 40 by the two clamping portions 23 is controlled as small as possible, as along as the clamping portions 23 come into contact with or come close to the casing 40. Hence, the clamping portions 23 can restrict the casing 40 from falling off of the support portions 22, when the casing 40 is being lifted.

The step 87 of front-and-rear positioning, as shown in FIG. 9, includes moving the casing 40 to the sucker 30, releasing the clamping portions 23 from the lateral flat surfaces 46 of the casing 40 by moving the clamping portions 23 away from each other, and then horizontally moving the support portions 22 with respect to the casing 40 to a position where the subsequent steps 87 and 88 of front-and-rear positioning and left-and-right positioning.

While we have shown and described various embodiments in accordance with the present invention, it is clear to those skilled in the art that further embodiments may be made without departing from the scope of the present invention.

What is claimed is:

1. A method for automatically positioning a casing being used in combination with a sucker and a robot arm which is provided with a clamping jaw and a clamping device to automatically position the casing which is formed with an opening, the method comprising:

placing a casing onto a shelf, and making the opening of the casing located toward the robot arm, wherein the casing includes a top lateral surface which defines the opening, an up-facing to-be-processed surface, a top inner surface opposite the to-be-processed surface, a bottom lateral surface opposite the top lateral surface, and two lateral flat surfaces connected between the top and bottom lateral surfaces;

controlling, prior to lifting, a distance between two clamping portions of the clamping device to be larger than a distance between the two lateral flat surfaces of the casing, making support portions of the clamping device located towards the opening of the casing and lower than the top inner surface of the casing;

lifting the robot arm to move the support portions of the clamping device through the opening into the casing, making free ends of the support portions extend over a center of gravity of the casing, and then lifting the casing;

positioning in a front-and-rear direction by moving the casing to a position where the bottom lateral surface are stopped against a buffer plate of the sucker, and moving the support portions with respect to the casing until the top lateral surface of the casing is stopped against the abutting surfaces of the clamping device; and moving by left-and-right positioning the two clamping portions toward each other to clamp the lateral flat surfaces of the casing; wherein the sucker includes a fixing plate, a plurality of connecting rods disposed on the fixing plate, the buffer plate which is disposed on the connecting rods and capable of moving towards or away from the fixing plate to push against a bottom lateral surface of the casing, and a plurality of elastic members sleeved onto the connecting rods and located between the fixing plate and the buffer plate to push the fixing plate and the buffer plate away from each other.

2. The method for automatically positioning the casing as claimed in claim 1, wherein the lifting step further includes using the clamping device to lift the casing, and then moving the two clamping portions towards each other until they clamp the lateral flat surfaces of the casing, and the positioning in a front-and-rear direction step further includes moving the casing to the sucker, and moving the two clamping portions away from each other to release the clamping portions from the lateral flat surfaces of the casing.

3. A method for automatically positioning a casing being used in combination with a sucker and a robot arm which is provided with a clamping jaw and a clamping device to automatically position the casing which is formed with an opening, the method comprising:

placing a casing onto a shelf, and making the opening of the casing located toward the robot arm, wherein the casing includes a top lateral surface which defines the opening, an up-facing to-be-processed surface, a top inner surface opposite the to-be-processed surface, a bottom lateral surface opposite the top lateral surface, and two lateral flat surfaces connected between the top and bottom lateral surfaces;

controlling, prior to clamping, a distance between two clamping portions of the clamping device to be larger than a distance between the two lateral flat surfaces of the casing, and making the support portions of the clamping device located towards the opening of the casing and lower than the top inner surface of the casing;

using the robot arm to move and clamp the support portion of the clamping device through the opening into the casing, keeping moving the clamping device to a depth where the two clamping portions are capable of securely clamping the casing, then moving the clamping portions toward each other to clamp the lateral flat surfaces of the casing;

using the robot arm to move and place the casing in a flat work area, stopping the casing a position above a flat work surface, and releasing the clamping portions from the lateral flat surfaces of the casing by moving the clamping portions away from each other, and letting the casing fall onto the flat work surface;

controlling, prior to lifting, a distance between the two clamping portions of the clamping device to be larger than a distance between the two lateral flat surfaces of the casing, making support portions of the clamping device located towards the opening of the casing and lower than the top inner surface of the casing;

lifting the robot arm to move the support portions of the clamping device through the opening into the casing, making free ends of the support portions extend over a center of gravity of the casing, and then lifting the casing;

positioning in a front-and-rear direction by moving the casing to a position where the bottom lateral surface are stopped against a buffer plate of the sucker, and moving the support portions with respect to the casing until the top lateral surface of the casing is stopped against the abutting surfaces of the clamping device; and moving by left-and-right positioning the two clamping portions toward each other to clamp the lateral flat surfaces of the casing; wherein the sucker includes a fixing plate, a plurality of connecting rods disposed on the fixing plate, the buffer plate which is disposed on the connecting rods and capable of moving towards or away from the fixing plate to push against a bottom lateral surface of the casing, and a plurality of elastic members sleeved onto the connecting rods and located between the fixing plate and the buffer plate to push the fixing plate and the buffer plate away from each other.

4. The method for automatically positioning the casing as claimed in claim 3, wherein the lifting step further includes using the clamping device to lift the casing, and then moving the two clamping portions towards each other until they clamp the lateral flat surfaces of the casing, and the positioning in a front-and-rear direction step further includes moving the casing to the sucker, and moving the two clamping portions away from each other to release the clamping portions from the lateral flat surfaces of the casing.

* * * * *